(12) United States Patent
Galloni

(10) Patent No.: US 7,004,745 B2
(45) Date of Patent: Feb. 28, 2006

(54) STRETCH BLOW MOLDING MACHINE HAVING IMPROVED CONTROL OF THE STRETCH ROD

(75) Inventor: Bruno Galloni, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 142 days.

(21) Appl. No.: 10/363,559

(22) PCT Filed: Sep. 21, 2001

(86) PCT No.: PCT/FR01/02941

§ 371 (c)(1),
(2), (4) Date: Jul. 24, 2003

(87) PCT Pub. No.: WO02/24435

PCT Pub. Date: Mar. 28, 2002

(65) Prior Publication Data

US 2004/0009257 A1    Jan. 15, 2004

(30) Foreign Application Priority Data

Sep. 25, 2000 (FR) .................................. 00 12265

(51) Int. Cl.
*B29C 49/12*    (2006.01)
(52) U.S. Cl. ...................... 425/182; 264/532; 425/529; 425/535; 425/540
(58) Field of Classification Search .............. 425/182, 425/529, 535, 540; 264/532; B29C 49/12
See application file for complete search history.

(56) References Cited

U.S. PATENT DOCUMENTS

| 3,871,856 | A | * | 3/1975 | Trahan ......................... 65/261 |
| 4,039,641 | A | * | 8/1977 | Collins ....................... 264/532 |
| 4,214,860 | A |   | 7/1980 | Kleimenhagen et al. |
| 4,488,863 | A | * | 12/1984 | Collette ...................... 264/530 |
| 4,499,044 | A | * | 2/1985 | Hone et al. ................. 264/532 |
| 5,200,134 | A | * | 4/1993 | Collombin et al. ......... 264/532 |
| 5,585,066 | A |   | 12/1996 | Weiss |
| 5,648,026 | A | * | 7/1997 | Weiss ......................... 264/526 |
| 5,817,348 | A | * | 10/1998 | Ikeda .......................... 425/529 |
| 6,464,486 | B1 | * | 10/2002 | Barray et al. ............... 425/535 |

FOREIGN PATENT DOCUMENTS

EP     0 824 978 A    2/1998

* cited by examiner

*Primary Examiner*—Robert B. Davis
(74) *Attorney, Agent, or Firm*—Sughrue Mion, PLLC

(57) ABSTRACT

A machine for making thermoplastic containers by stretching and blowing a preform including at least a stretch rod which is slidably controlled along its axis by an actuator from a retracted position to a stretching position to stretch the preform during the blowing process. When the stretch rod returns toward its retracted position, the actuator is idle, such that the stretch rod is returned by a blowing pressure prevailing inside the container being produced so as to act on a working end of the stretch rod.

8 Claims, 4 Drawing Sheets

STRETCH BLOW MOLDING MACHINE HAVING IMPROVED CONTROL OF THE STRETCH ROD

BACKGROUND OF THE INVENTION

The invention concerns the field of machines for manufacturing containers made of thermoplastic material by stretching and blow molding a preform that has previously been produced by injection molding.

In particular, such machines are used to manufacture containers, such as bottles made of polyethylene terephtalate (PET).

In such a machine, preforms are used that are appreciably tubular and which are closed at one of their axial ends, the other axial end being open and already has the final shape of the neck of the container.

Each preform is heated in the thermal conditioning oven in order to bring the body of the preform up to a temperature that is higher than the vitreous transition temperature of the thermoplastic material. The preform thus conditioned is transferred to a blow mold in which a cavity is delimited in the shape of the container to be obtained. The preform is placed in the mold so that its open end extends outside the mold. Thus, a blow-molding device can be taken to the level of the neck of the preform in order to inject pressurized air into the preform. Simultaneously, a stretch rod is inserted axially into the preform until it presses against the closed end of the bottom of the preform. The stretch rod thus makes it possible better to control the axial deformation of the preform during the blow molding of the container.

For example, the invention can be implemented in a rotary type stretch blow-molding machine in which the machine includes several blow-molding stations mounted at the periphery of a carrousel that is driven in continuous rotation around its axis. Each blow-molding station includes in particular a blow mold, a blow device, and a stretch device.

According to a known design, the movement of the stretch rod is controlled by a pneumatic cylinder that furnishes the energy required to move the rod, but the stretching speed is regulated by a cam and roller device that enables the axial position of the stretch rod to be perfectly synchronized depending on the angular position of the blow-molding station concerned around the axis of rotation of the carrousel.

These systems are completely satisfactory in terms of operation of the blow-molding process. However, the need has appeared to significantly decrease the overall energy consumption of these blow-molding machines. Indeed, one of the sources of energy consumption of the previously known machines are the stretch rod control cylinders of each blow-molding station that must be fed with pressurized air both to lower and to raise the rod.

SUMMARY OF THE INVENTION

A purpose of the invention, therefore, is to propose a particularly simple and effective solution for controlling the movements of the stretch rod.

To that end, the invention proposes a machine for manufacturing containers made of thermoplastic material by stretching and blow-molding a preform, of the type comprising at least a stretch rod that is slidably controlled along its axis by an actuator from a retracted position to a maximum stretching position to ensure the stretching of the preform during the blow-molding operation, characterized in that, during the return of the stretch rod to its retracted position, the actuator is at rest, the return of the rod being ensured by the blow pressure that is inside the container being manufactured and which acts on the working end of the rod.

According to other characteristics of the invention:
  the machine includes auxiliary means for returning the rod to its rest position in the event of malfunction;
  the machine includes several molding stations that are mounted on a carrousel driven in continuous rotation around its axis with respect to a frame of the machine; each station is furnished with at least a stretch rod; the machine includes a safety cam that is attached to the frame, and each stretch rod includes a cam follower that can cooperate with the safety cam to return the stretch rod to its retracted position if, when passing in front of the cam, the respective rod has not previously returned to its retracted position;
  the actuator is a fluid pressure cylinder;
  the actuator is a pneumatic cylinder;
  the actuator includes a pressure chamber that is fed by compressed air to move the rod to its stretch position, and said chamber is connected to the open air to allow the rod to return to its retracted position;
  the actuator is single-acting; and
  the machine includes auxiliary means for locking the rod in the retracted position.

BRIEF DESCRIPTION OF THE DRAWINGS

Other characteristics and advantages of the invention will be apparent from the detailed description that follows, and from the attached drawings in which.

DETAILED DESCRIPTION OF EXEMPLARY NON-LIMITING EMBODIMENTS OF THE INVENTION

Figure 1:
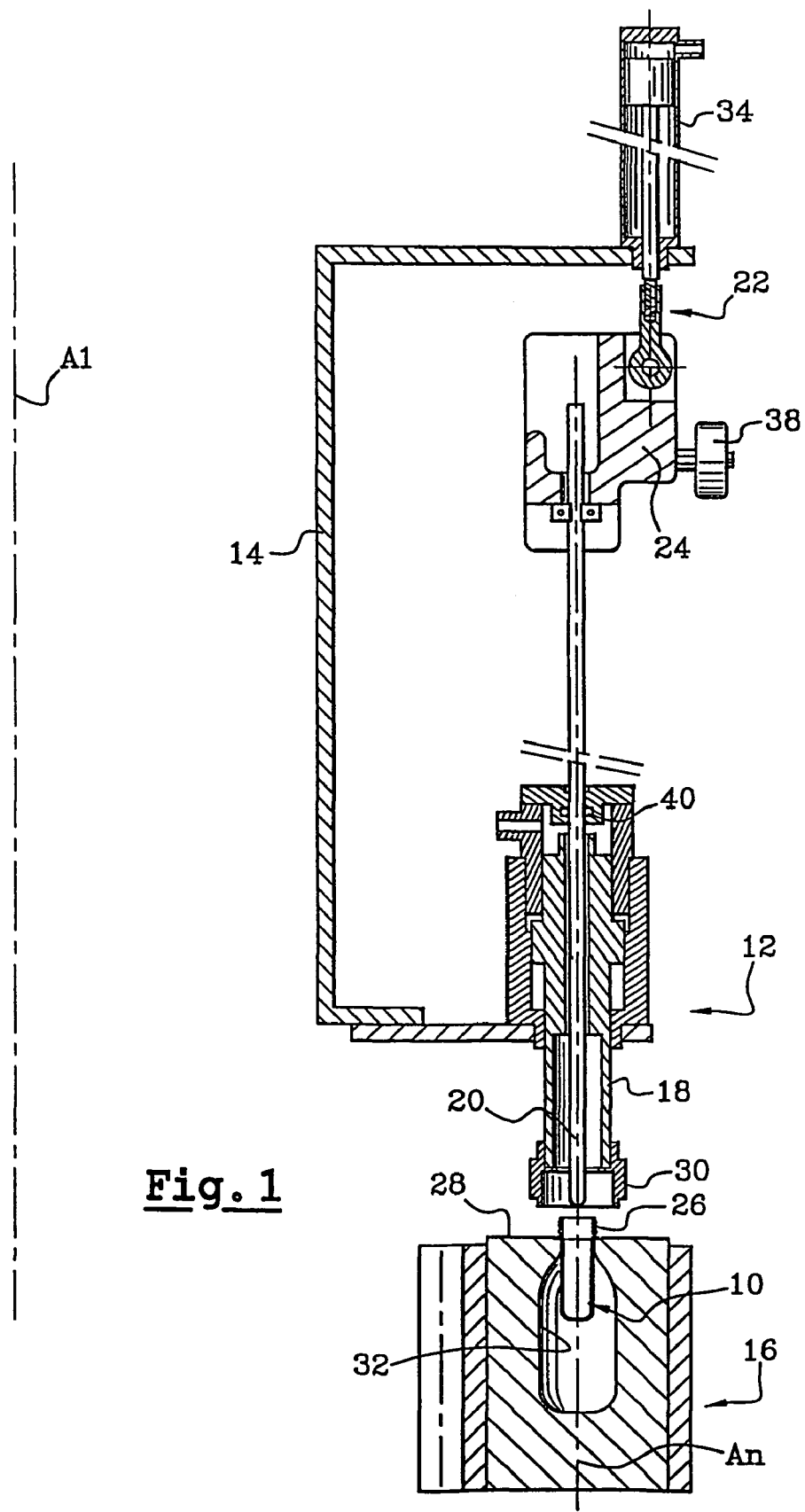
FIGS. 1 to 4 are diagrammatical views in axial cross section illustrating four phases of operation of a blow-molding station according to the terms of the invention.

Represented in the figures, diagrammatically and partially, is a machine for manufacturing containers of thermoplastic material by stretching and blow molding a preform 10 that has previously been produced by injection molding.

More particularly, this machine is of the rotary type, that is, it includes several stretch blow-molding stations 12 mounted on a carrousel 14. The carrousel 14 is driven in continuous rotation around its axis A1.

Each stretch blow-molding station 12 essentially includes a blow mold 16, a blow pin 18, a stretch rod 20, and means 22 for controlling the movements of the stretch rod 20.

In the example illustrated, the axis A1 of rotation of the carrousel 14 is a vertical axis and each stretching station 12 being on a vertical axis An, the axes An being arranged at regular intervals on a circle around the axis A1. The preforms 10 are blown with their open end upward so that the blow pin 18 and the stretch rod 20 are placed above the mold 16. This arrangement gives rise to the notion of up and down that will be used in the text that follows, but should not be interpreted as being limitations to the scope of the invention.

As a result of this arrangement, the stretch rod 20 of each station 12 is therefore moved vertically along the respective axis An between an upper retracted position and a maximum lower stretch position. More specifically, since each blow-molding station proceeds with the blow molding of a container at each turn of the carrousel 14, the rods 20 make a round trip between their upper and lower positions with each turn of the carrousel 14.

In a known way, the rods 20 are attached at their upper end to a slide 24 that can slide vertically on a rail (not shown) mounted on the carrousel 14. Moreover, each rod 20 extends axially through the respective blow pin 18 so that its lower end can engage axially in a preform held in a cavity of the mold 16. The rods 20 are, for example, cylindrically generated by rotation around axis An, and they have a lower end 46 that is appreciably hemispherical and is intended to press against the bottom of the preform 10 to stretch it axially during the blow-molding.

In the example illustrated, the preform 10 is engaged in the mold 16 so that its neck 26 extends above the upper face 28 of the mold 16.

The pin 18 in this instance is a bell-shape 30 that is axially movable between an upper retracted position (illustrated in FIG. 1) and a lower blow-molding position (illustrated in FIGS. 2 to 4) in which the bell 30 is pressed against the upper face 28 of the mold 16, while surrounding the neck 26 of the preform. In this position, the inside of the preform and the inside of the pin 18 form a closed chamber in which pressurized air can be injected, allowing the preform to be deformed to press it against the walls of the cavity 32 of the mold 16 in order to give it the shape of the container that is being manufactured.

The rod 20, which axially passes through the interior of the pin 18, can slide sealably through an upper wall of the pin 18. A seal ring 40 ensures that, when the pin is in the blow-molding position, the seal of the blow volume is preserved in spite of the possibility of the rod sliding with reference to the pin.

In a known way, the stretch rod 20 is controlled to accompany the deformation of the preform 10 by pushing the bottom of the preform toward the bottom of the cavity of the mold. To that end, the blow-molding station includes an actuator that acts on the slide 24 to cause it to slide axially downward. For example, the actuator is a single-acting pneumatic cylinder 34 which, when fed with pressurized air, forces the slide downward. The stretching speed is preferably controlled by a cam 36 that extends as a helix around the axis A1 of the carrousel 14. The slide 24 has a roller 38, which under the action of the cylinder 34, presses against the cam 36 so that the instantaneous position of the rod 20 is perfectly controlled as a function of the instantaneous angular position of the blow-molding station 12 around the axis A1. Thus, although the cylinder 34 is controlled in a very simple, "all or nothing" way, the moment stretching is begun and the speed of stretching are perfectly controlled.

Figure 2:
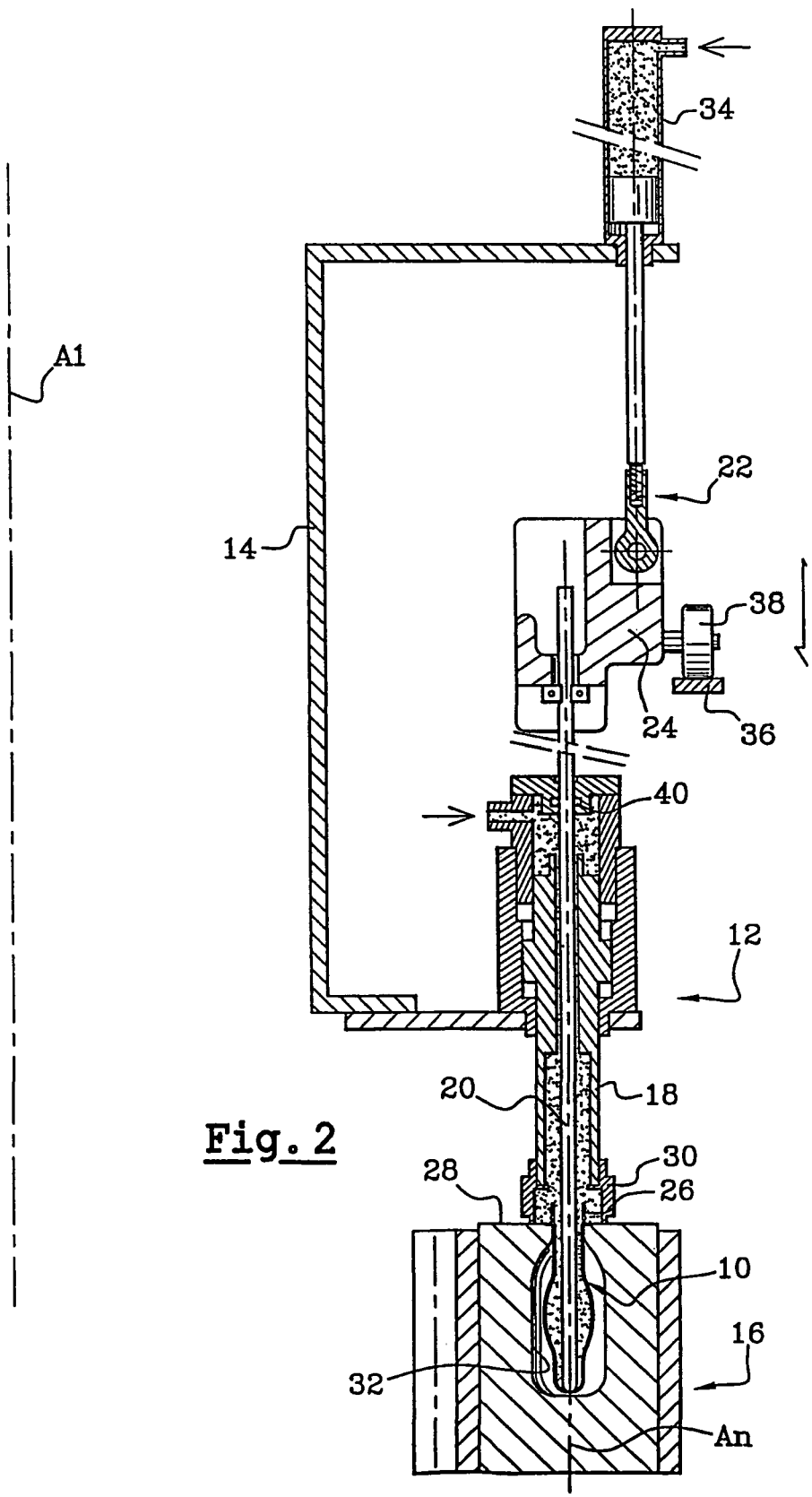

As can be seen in FIG. 2, the lowering of the stretch rod occurs generally at the same time as a pre-blow-molding operation during which the blow-molding air is injected at a moderate pressure, such as 13 bars, into the preform 10 through the pin 18.

Figure 3:
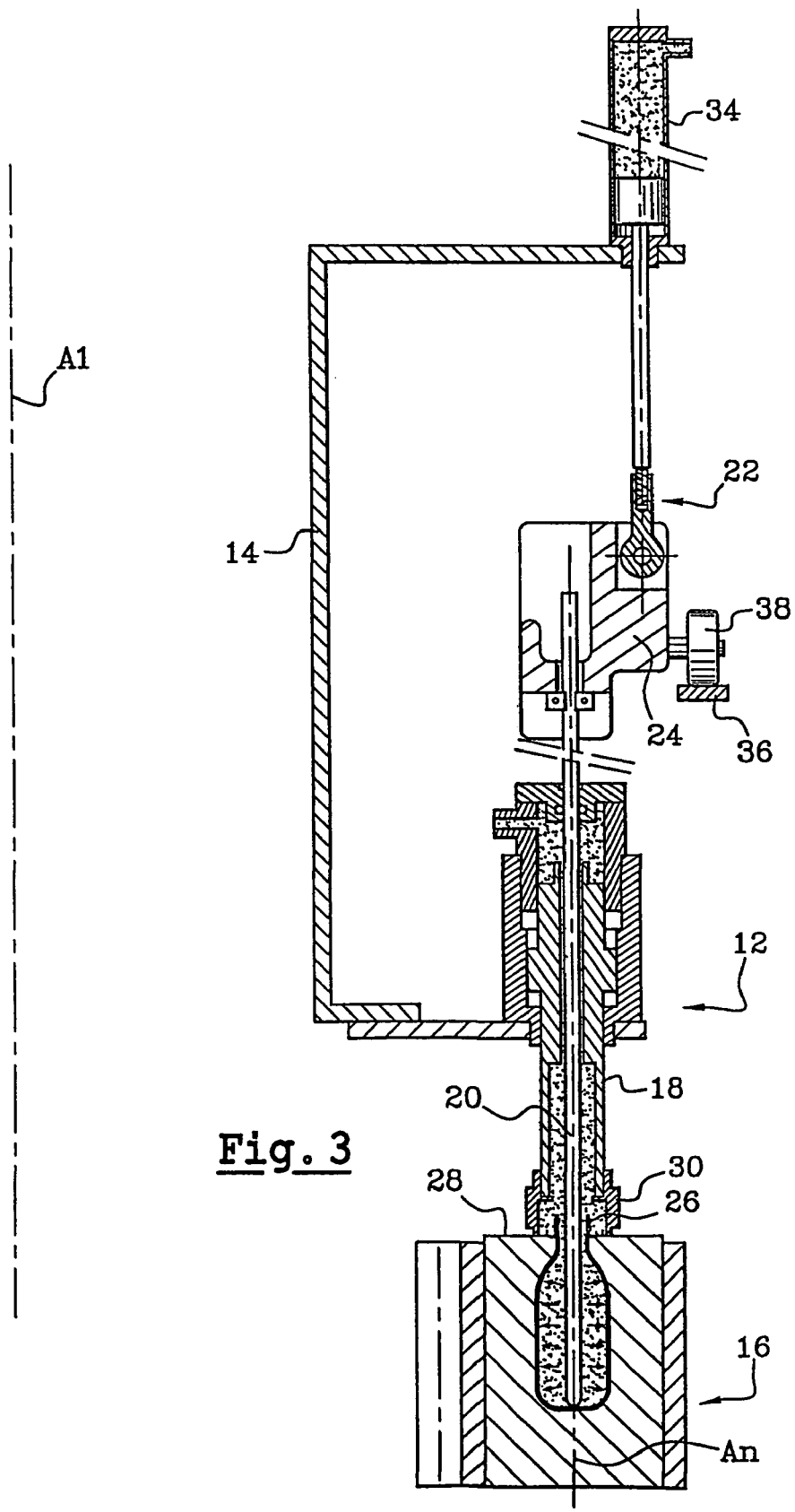

During a subsequent step, illustrated in FIG. 3, the air injected into the preform by the pin 18 is the high pressure air, for example on the order of 40 bars, so that the thermoplastic material conforms perfectly to the shapes of the cavity 32. The strong pressure is maintained for a period that can extend up to several seconds so that the thermoplastic material cools and stiffens in contact with the walls of the cavity 32.

As long as the material has not reached the final shape of the container, it is preferable to hold the stretch rod in the lowered position to prevent any misalignment of the bottom of the preform with reference to the bottom of the cavity 32. To that end, the pneumatic cylinder must be left under pressure.

Once the material has reached its final shape under the effect of the high pressure, it is possible to allow the stretch rod to be raised again, even before the end of the cooling phase of the material.

According to the invention, the raising of the rod 20 is not controlled by the actuator. On the contrary, the actuator is left at rest. In the case of the cylinder 34, its control chamber is simply vented.

At that moment, the rod 20, simply under the effect of the blow-molding pressure in the container in process of formation, tends to rise back up to its retracted position. Indeed, because of the presence of the seal ring 40, only the lower portion of the rod 20 is exposed to the blow-molding pressure.

Although the effects of the pressure on the vertical walls of the rod 20 cancel each other out, the effect of the pressure on the lower end 46 of the rod is not compensated. The rod 20 is therefore subjected to an upward axial force that is equal to the blow-molding pressure multiplied by the transverse surface area of the rod in cross section. Depending on the situation, this force can be on the order of 50 to 150 daN, which is easily enough to compensate for the weight of the rod 20 and its control mechanism, and thus to cause the rod to return to its retracted position.

Figure 4:
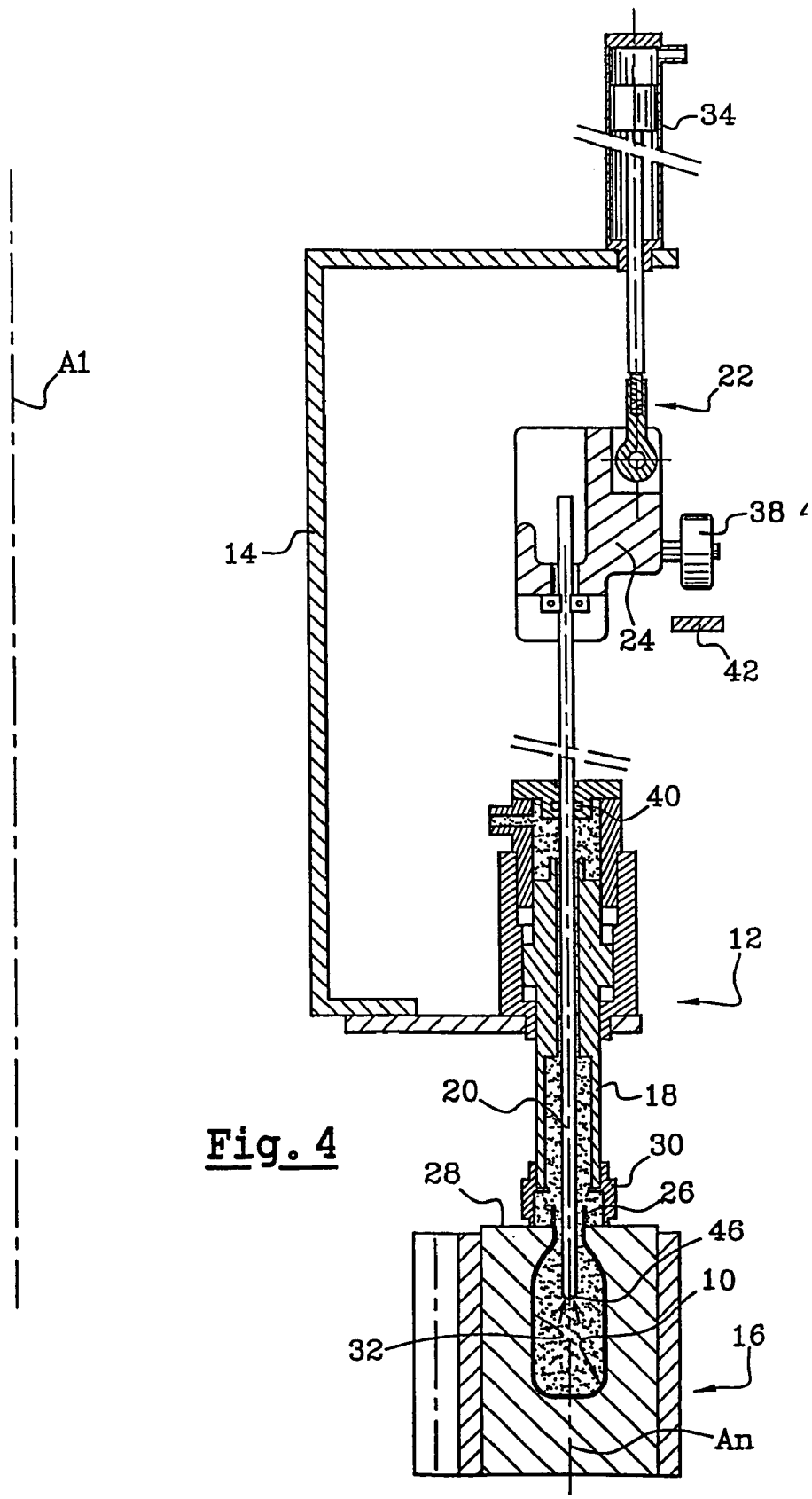

As can be seen in FIG. 4, it is preferable to provide a safety cam 42 that is similar to the regulation cam but is configured to force the rod 20 to return to its retracted position if the roller 38 comes into contact with it. Preferably, this safety cam 42 is positioned so as not to be used during normal operation of the device, the roller 38 thus not coming into contact with the cam 42, as illustrated in FIG. 4. This makes it possible to limit the noise of the operation of the device and to limit the wear of the cam 42 and the roller 38.

The safety cam 42 makes it possible to ensure that the rod 20 is clear of the mold 16 when the container is to be ejected at the end of molding, even if the air under pressure escapes from the mold, for example if the preform 10 bursts during the blow-molding.

Preferably, means will also be provided for locking the rod 20 in the retracted position.

The invention was just described in the case in which the blow-molding station is provided with a mold 16 having only one cavity. It may also be implemented in the case of a blow-molding station with dual cavity having two stretch rods controlled by the same actuator.

Moreover, the invention can be implemented within the scope of blow-molding machines in which the stretch blow-molding operation is accomplished with the neck of the preform oriented downward.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

What is claimed is:

1. A machine for manufacture of thermoplastic containers comprising:
    at least one stretch rod that is slidably controlled along its axis; and
    an actuator associated with the at least one stretch rod, said actuator causing the at least one stretch rod to slide along its axis from a retracted position to a stretching position,
    wherein the at least one stretch rod is operable to be returned to its retracted position by a blow pressure of a container being blow-molded, and
    the actuator is in a state of rest while the stretch rod is returned to its retracted position.

2. The machine according to claim 1 further comprising auxiliary means for returning the stretch rod to its retracted position in the event of malfunction.

3. The machine according to claim 2 further comprising several molding stations that are mounted on a carrousel driven in continuous rotations, each station comprising at least one stretch rod, a safety cam, and a cam follower, wherein the cam follower can cooperate with the safety cam to respectively return the stretch rods to their retracted position if, when passing in front of the cam, the stretch rods have not previously returned to their retracted positions.

4. The machine according to claim 1 wherein the actuator is a fluid pressure cylinder.

5. The machine according to claim 4 wherein the actuator is a pneumatic cylinder.

6. The machine according to claim 5 wherein the actuator comprises a pressure chamber that can be fed by compressed air to move the stretch rod to its stretching position and can be opened to allow the stretch rod to return to its retracted position.

7. The machine according to claim 1 wherein the actuator is single acting.

8. The machine according to claim 1 further comprising auxiliary means for locking the stretch rod in its retracted position.

* * * * *